US009262142B2

(12) United States Patent
Brauneis et al.

(10) Patent No.: US 9,262,142 B2
(45) Date of Patent: *Feb. 16, 2016

(54) WEB APPLICATION DEVELOPMENT TOOL

(75) Inventors: David N. Brauneis, Raleigh, NC (US); Christopher C. Mitchell, Raleigh, NC (US); Brent H. Daniel, Morrisville, NC (US); Richard A. Backhouse, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2113 days.

This patent is subject to a terminal disclaimer.

(21) Appl. No.: 12/251,266

(22) Filed: Oct. 14, 2008

(65) Prior Publication Data
US 2009/0037878 A1 Feb. 5, 2009

Related U.S. Application Data

(63) Continuation of application No. 10/721,818, filed on Nov. 24, 2003, now Pat. No. 7,480,895.

(51) Int. Cl.
G06F 9/44 (2006.01)
G06F 9/445 (2006.01)

(52) U.S. Cl.
CPC ......................................... G06F 8/60 (2013.01)

(58) Field of Classification Search
USPC .......................................................... 717/121
See application file for complete search history.

(56) References Cited

U.S. PATENT DOCUMENTS

| 5,047,918 | A | 9/1991 | Schwartz et al. |
| 5,966,702 | A | 10/1999 | Fresko et al. |
| 6,230,184 | B1 | 5/2001 | White et al. |
| 6,336,122 | B1 * | 1/2002 | Lee et al. |
| 6,493,870 | B1 | 12/2002 | Madany et al. |
| 6,675,382 | B1 | 1/2004 | Foster |
| 6,901,590 | B2 | 5/2005 | Narayanaswamy et al. |
| 6,976,093 | B2 | 12/2005 | Lara et al. |
| 7,069,553 | B2 | 6/2006 | Narayanaswamy et al. |
| 7,165,249 | B2 | 1/2007 | Potter et al. |
| 7,171,422 | B2 | 1/2007 | Hayes et al. |
| 7,197,519 | B2 | 3/2007 | Nishikawa et al. |
| 7,210,124 | B2 | 4/2007 | Chan |
| 7,480,895 | B2 * | 1/2009 | Brauneis et al. ............... 717/120 |
| 2002/0178439 | A1 | 11/2002 | Rich et al. |
| 2002/0184187 | A1 | 12/2002 | Bakalash et al. |
| 2003/0018642 | A1 | 1/2003 | Bakalash et al. |

(Continued)

OTHER PUBLICATIONS

Chan, "J2EE Application Deployment Considerations", Jun. 11, 2003, pp. 1-8, retrieved from scholar.google.com on Oct. 2, 2007.

Primary Examiner — Marina Lee
(74) Attorney, Agent, or Firm — Cuenot, Forsythe & Kim, LLC

(57) ABSTRACT

Method, system and computer program product are provided to increase the efficiency of the development of Java Enterprise Edition (J2EE) applications. A project may be divided into modules which may be developed by independent teams. The files within each module are classified as independent of resources in other modules or dependent. Independent files may be packaged into a single, integrated web application archive (WAR) file without further processing. Corresponding dependent files are compared and any conflicts are resolved. The resulting files may then be packaged into the WAR file.

18 Claims, 2 Drawing Sheets

(56) References Cited

U.S. PATENT DOCUMENTS

| | | |
|---|---|---|
| 2003/0033360 A1 | 2/2003 | Garnett et al. |
| 2003/0050967 A1 | 3/2003 | Bentley |
| 2003/0061191 A1 | 3/2003 | Pearson |
| 2003/0093471 A1 | 5/2003 | Upton |
| 2003/0182651 A1 | 9/2003 | Secrist et al. |
| 2004/0039728 A1* | 2/2004 | Fenlon et al. .................. 707/1 |
| 2004/0177358 A1* | 9/2004 | Narayanaswamy et al. .. 719/310 |
| 2005/0108259 A1 | 5/2005 | Watanabe et al. |
| 2005/0114630 A1* | 5/2005 | Brauneis et al. .............. 712/220 |
| 2009/0037878 A1* | 2/2009 | Brauneis et al. .............. 717/120 |

* cited by examiner

WEB APPLICATION DEVELOPMENT TOOL

This application is a continuation of application Ser. No. 10/721,818, filed Nov. 24, 2003, status allowed.

TECHNICAL FIELD

The present invention relates generally to the development of web applications and, in particular, to merging independently developed modules into an integrated web application.

BACKGROUND ART

Large software projects are frequently divided into separate components to be completed by independent development teams. For example, in Java Enterprise Edition (J2EE) projects, applications are typically divided into a presentation or user interface component, a business logic component and a data component, each completed by an independent development team. Separating the development of an application in this manner reduces the complexity of development by isolating each team from the effects of changes in other parts of the project implemented by other teams.

However, such a division of development effort may still be subject to unnecessary complexity in very large projects. Upon completion of the J2EE components, the presentation and business components are generally combined into a single archive (WAR) file. Although the two components could be packaged into multiple WAR files, separate packaging is not preferable because each WAR file has its own configuration data and/or runtime resources. Thus, WAR files will not be able to share resources, such as a context root (configuration data) or a session (runtime resource), with other WAR files.

Consequently, a need exists to independently develop the separate components of a project while integrating the components into a single logical component at runtime.

SUMMARY OF THE INVENTION

The present invention provides method, system and computer program product to increase the efficiency of the development of Java Enterprise Edition (J2EE) applications. A project may be divided into modules which may be developed by independent teams. The files within each module are classified as independent of resources in other modules or dependent. Independent files may be packaged into a single, integrated web application archive (WAR) file without further processing. Corresponding dependent files are compared and any conflicts are resolved. The resulting files may then be packaged into the WAR file.

Changes made to a module during development may be process and tested against modules previously integrated into the WAR file.

Similarly, subsequent revisions to a module may be incorporated into the WAR file after first being processed to resolve any conflicts with files in the existing modules.

DETAILED DESCRIPTION OF THE PREFERRED EMBODIMENT

Figure 1:
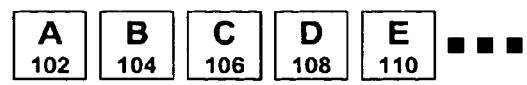
FIG. 1 is a representation of files available for an exemplary J2EE development project.
Figure 2:
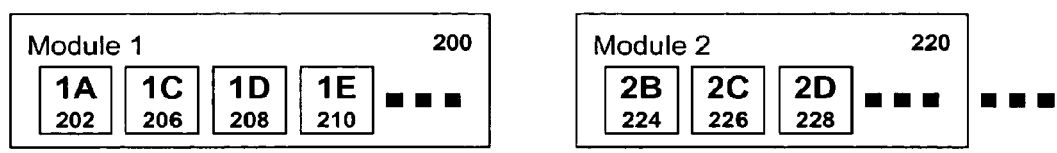
FIG. 2 is a representation of the files of FIG. 1 incorporated into independently developed modules.

FIG. 1 is a representation of some of the resources, such as files File A 102, File B 104, File C 106, File D 108 and File E 110, which are available for an exemplary J2EE development project; it will be appreciated that many additional resources are typically present in a project. The project is divided into modules to be developed independently by different teams. Two such modules 200 and 220 are illustrated in FIG. 2; it will be appreciated that many additional modules are typically present in a project. The development team of the first module 200 has incorporated copies of some of the files: A 102, C 106, D 108 and E 110; the copies have been designated files 1A 202, 1C 206, 1D 208 and 1E 210. The development team of the second module 220 has also incorporated copies of files C 106 and D 108 as well as copies of file B 104; these copies have been designated files 2B 204, 2C 206 and 2D 208.

Figure 3:
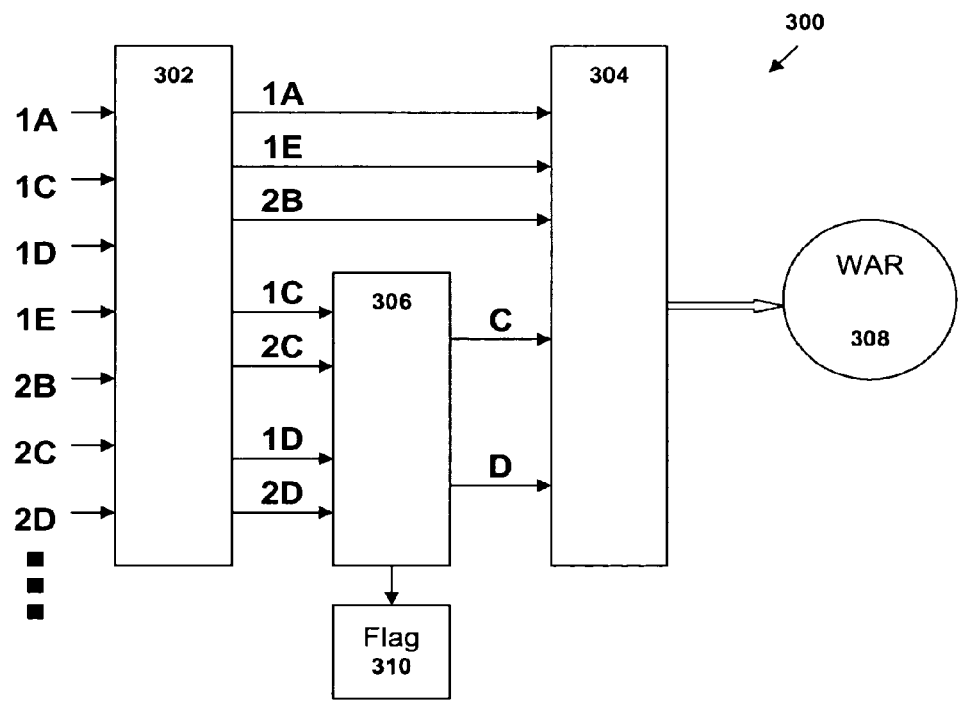
FIG. 3 is a block diagram of the merge tool of the present invention.
Figure 4:
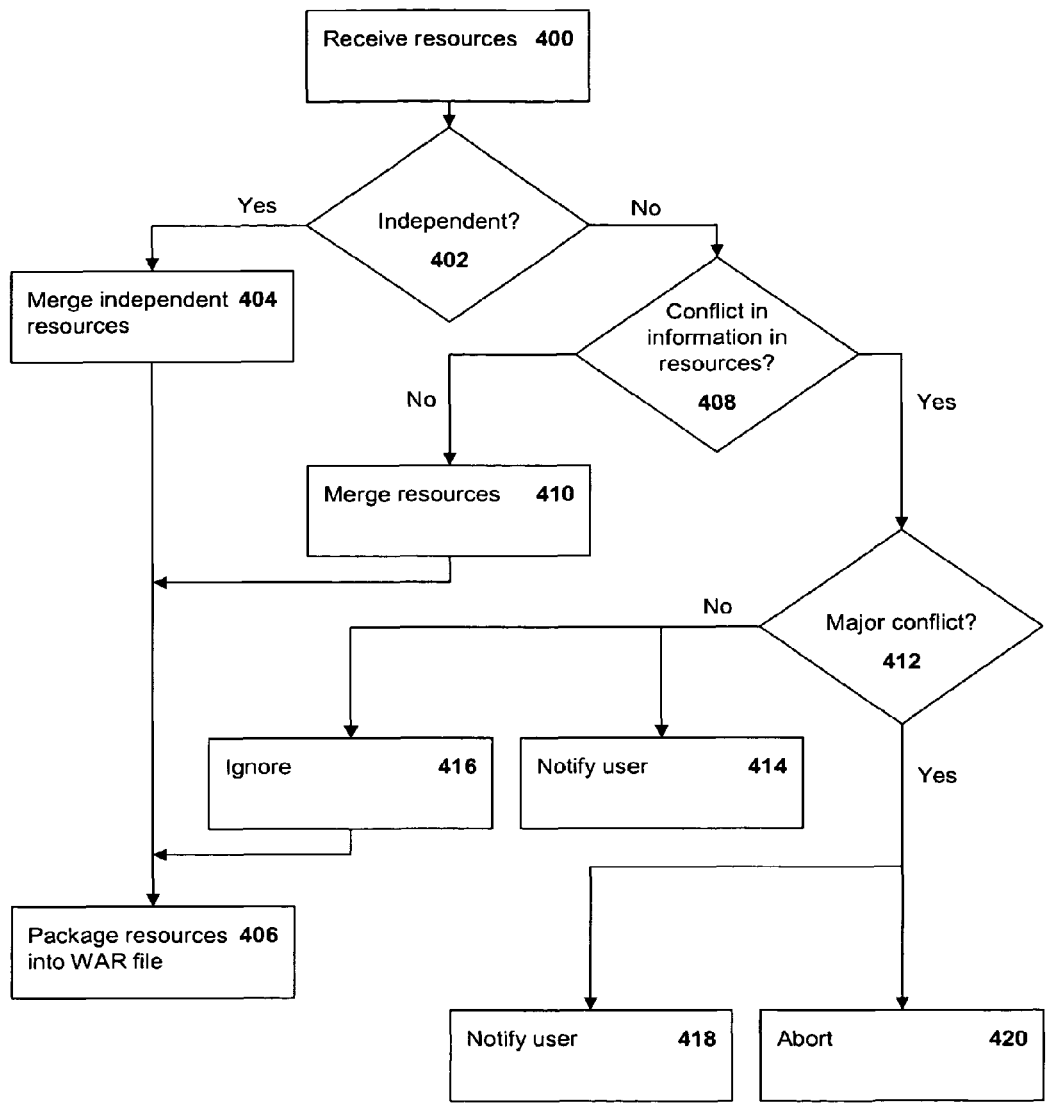
FIG. 4 is a flow chart of the merge process of the present invention.

Referring to the block diagram of FIG. 3 and the flow chart of FIG. 4, after the teams have completed their modules, all of the resources (files 1A, 1C, 1D, 1E, 2B, 2C and 2D) are received in a first section 302 of the merge tool 300 of the present invention (step 400). In the first section 302 the resources of each module are examined to determine which are independent and do not correspond to any resource in a different module (step 402). An example of an independent file might include an XML file which defines validation constraints for a STRUTS framework. In FIGS. 2 and 3, files 1A 202 and 1E 210 are used only in the first module 200 while file 2B 224 is used only in the second module 220. Thus, these three files are independent. The independent files are processed by a second section 304 of the tool 300 (step 404) and packaged into the application's WAR file (step 406).

The remaining resources used in the first module 200 are each related to a corresponding resource in the second module: file 1C 206 is related to file 2C 226; file 1D 208 is related to file 2D 228. For example, a file to map error codes to error messages might be used in two modules.

In a third section 306 of the tool 300, the related files are compared (step 408). The information in two corresponding files (such as files 1C and 2C) is examined to determine if any conflicts exist between the two. If no conflicts are present, the two files are merged (step 410) and passed to the second section 304 to be packaged in the WAR file 308.

If a conflict in the information of two resources is identified, it must be determined whether the conflict is major or minor (step 412). If minor, a user may be notified with an appropriate message 310 (step 414), allowing the user to decide how to proceed. While less preferable, the information in one file may alternatively be ignored (step 416), displaced by the information in the other file.

If the conflict is irreconcilable and, therefore, major, the user may be notified with an error message 310 (step 418), allowing the user to decide how to proceed. Alternatively, the process may abort (step 420), giving the development groups an opportunity to resolve the conflict by revising one or both of the related modules.

After conflicts have been resolved, the merged files (files C and D in the example) are passed to the second section 304 of the tool 300 to be packaged in the WAR file 308 (step 406). The WAR file 308 is then ready to be installed into a J2EE application server as a J2EE application.

During development, a development team may want to make revisions to a file and determine if the revisions will perform as expected. The module in which the revisions were made may be processed by the tool 300 and tested against other modules already integrated into the WAR file 308.

Similarly, after development, revisions or updates to a file may be made. The module in which the revisions were made may be processed by the tool 300 and integrated into the WAR file 308.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method of packaging a web application, comprising:
   receiving a first module developed by a first development team;
   receiving a second module developed by a second development team separate from the first development team, each of the first and second modules including a plurality of resources;
   parsing the first and second modules to identify a pair of related resources, one of the pair of the related resources from the first module and an other of the pair of the related resources from the second module;
   merging the pair of related resources into a single merged resource; and
   packaging the plurality of resources from both the first and second modules into a web application file, wherein
   the single merged resource is packaged within the web application file in lieu of the pair of related resources.

2. The method of claim 1, wherein
   the merging comprises determining whether information within the one of the pair of related resources conflicts with information within the other of the pair of related resources.

3. The method of claim 2, wherein
   the packaging is performed only after a determination is made that the information within the one of the pair of related resources does not conflict with the information within the other of the pair of related resources.

4. The method of claim 1, wherein
   the plurality of resources from both the first and second modules includes at least one independent resource.

5. The method of claim 1, wherein
   the first and second modules are web application archive files.

6. The method of claim 1, wherein the web application file is a Java Enterprise Edition (J2EE) archive file.

7. A computer hardware system for packaging a web application, comprising:
   a processor, wherein the processor is configured to perform
   receiving a first module developed by a first development team;
   receiving a second module developed by a second development team separate from the first development team, each of the first and second modules including a plurality of resources;
   parsing the first and second modules to identify a pair of related resources, one of the pair of the related resources from the first module and an other of the pair of the related resources from the second module;
   merging the pair of related resources into a single merged resource; and
   packaging the plurality of resources from both the first and second modules into a web application file, and
   the single merged resource is packaged within the web application file in lieu of the pair of related resources.

8. The computer hardware system of claim 7, wherein
   the merging comprises determining whether information within the one of the pair of related resources conflicts with information within the other of the pair of related resources.

9. The computer hardware system of claim 8, wherein
   the packaging is performed only after a determination is made that the information within the one of the pair of related resources does not conflict with the information within the other of the pair of related resources.

10. The computer hardware system of claim 7, wherein
    the plurality of resources from both the first and second modules includes at least one independent resource.

11. The computer hardware system of claim 7, wherein
    the first and second modules are web application archive files.

12. The computer hardware system of claim 7, wherein
    the web application file is a J2EE archive file.

13. A computer program product comprising a computer readable memory having stored therein computer usable program code for packaging a web application, the computer usable program code, which when executed by a computer hardware system, causes the computer hardware system to perform:
    receiving a first module developed by a first development team;
    receiving a second module developed by a second development team separate from the first development team, each of the first and second modules including a plurality of resources;
    parsing the first and second modules to identify a pair of related resources, one of the pair of the related resources from the first module and an other of the pair of the related resources from the second module;
    merging the pair of related resources into a single merged resource; and
    packaging the plurality of resources from both the first and second modules into a web application file, wherein
    the single merged resource is packaged within the web application file in lieu of the pair of related resources.

14. The computer program product of claim 13, wherein
    the merging comprises determining whether information within the one of the pair of related resources conflicts with information within the other of the pair of related resources.

15. The computer program product of claim 14, wherein
    the packaging is performed only after a determination is made that the information within the one of the pair of related resources does not conflict with the information within the other of the pair of related resources.

16. The computer program product of claim 13, wherein
    the plurality of resources from both the first and second modules includes at least one independent resource.

17. The computer program product of claim 13, wherein
    the first and second modules are web application archive files.

18. The computer program product of claim 13, wherein
    the web application file is a J2EE archive file.

* * * * *